United States Patent [19]

Oslin

[11] Patent Number: 5,732,614
[45] Date of Patent: Mar. 31, 1998

[54] FOOD PROCESSING APPARATUS

[75] Inventor: G. Robert Oslin, Chicago, Ill.

[73] Assignee: Delaware Capital Formation, Inc., Wilmington, Del.

[21] Appl. No.: 798,441

[22] Filed: Feb. 10, 1997

Related U.S. Application Data

[63] Continuation of Ser. No. 650,542, May 20, 1996, abandoned.

[51] Int. Cl.⁶ .............. A21B 1/00; A21B 1/08; A23L 1/00; A23L 3/16
[52] U.S. Cl. ............. 99/341; 99/448; 99/476; 126/20; 126/21 A; 126/20.2; 219/401; 219/492
[58] Field of Search .............. 99/330–336, 337, 99/341, 448, 467–476, 483; 126/20, 20.1, 20.2, 348, 369, 369.2, 369.3; 122/16, 17, 44.2, 135.3, 149; 219/400–401, 402, 492; 392/402; 432/209

[56] References Cited

U.S. PATENT DOCUMENTS

| | | | |
|---|---|---|---|
| 2,048,644 | 7/1936 | Winder et al. | 432/209 |
| 3,744,474 | 7/1973 | Shaw | 126/20 |
| 4,029,463 | 6/1977 | Johansson et al. | 126/21 A |
| 4,426,923 | 1/1984 | Ohata | 219/401 |
| 4,506,598 | 3/1985 | Meister | 99/330 |
| 4,608,260 | 8/1986 | Andre . | |
| 4,641,630 | 2/1987 | Meister . | |
| 4,700,685 | 10/1987 | Miller . | |
| 4,701,334 | 10/1987 | Durth . | |
| 4,817,582 | 4/1989 | Oslin et al. | 99/474 X |
| 4,823,766 | 4/1989 | Violi . | |
| 4,851,644 | 7/1989 | Oslin | 219/400 |
| 4,924,072 | 5/1990 | Oslin | 219/401 |
| 5,014,679 | 5/1991 | Childs et al. . | |
| 5,025,132 | 6/1991 | Fortmann et al. | 219/401 |
| 5,103,800 | 4/1992 | Bedford et al. . | |
| 5,158,064 | 10/1992 | Willis et al. . | |
| 5,161,518 | 11/1992 | Bedford . | |
| 5,171,078 | 12/1992 | Oslin et al. . | |
| 5,178,125 | 1/1993 | Kuen . | |
| 5,368,008 | 11/1994 | Oslin | 126/20.2 |
| 5,474,055 | 12/1995 | Kang | 99/337 X |
| 5,515,773 | 5/1996 | Bullard | 99/476 X |
| 5,525,782 | 6/1996 | Yoneno et al. | 99/468 X |

Primary Examiner—Timothy F. Simone
Attorney, Agent, or Firm—Welsh & Katz, Ltd.

[57] ABSTRACT

A food processing apparatus includes a cabinet defining a food processing compartment accessible through a front access opening, and has a door hinged on the cabinet for movement between open and closed positions relative to the access opening. The door includes inner and outer door panels pivotally interconnected to enable access between the panels. The inner and outer door panels have aligned windows with the windows on the inner panel being larger so as to enable light from lights mounted on the inside of the outer panel to illuminate the processing compartment without glare to the operator. Other features of the invention enable better control of zoned heating within the processing compartment when used in either convection steam or convection hot air modes of operation.

23 Claims, 9 Drawing Sheets

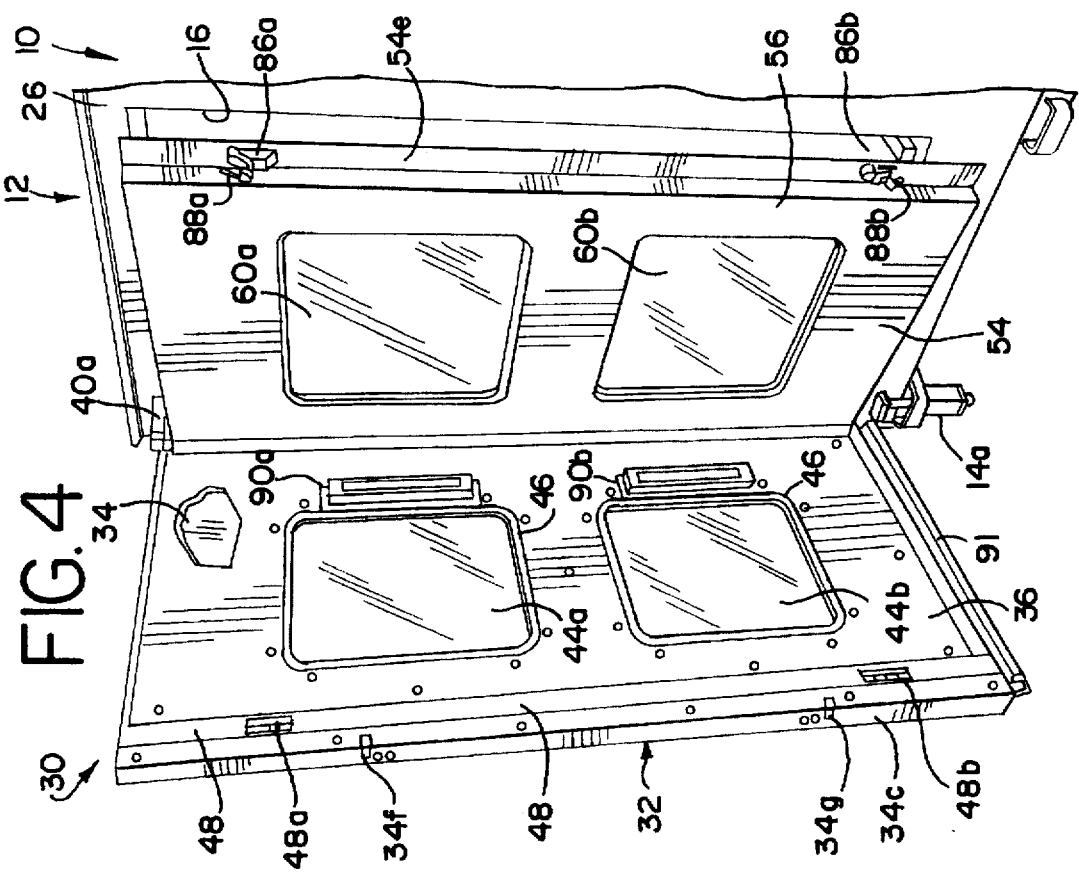

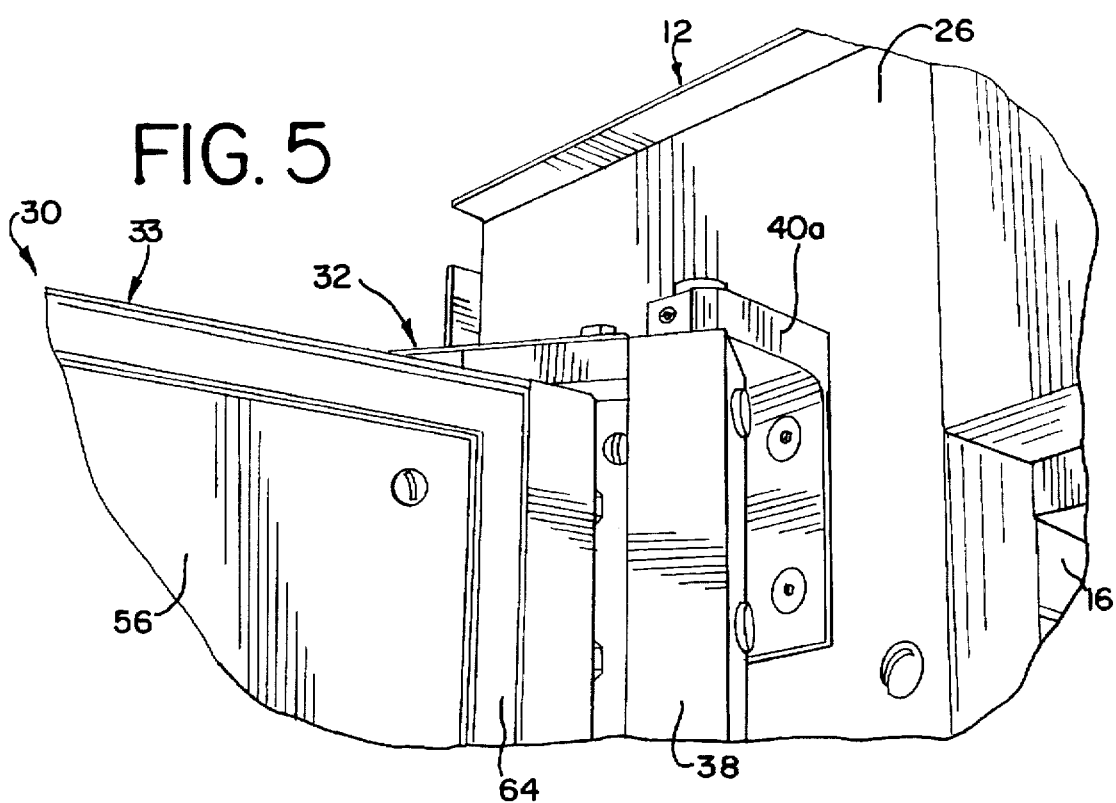
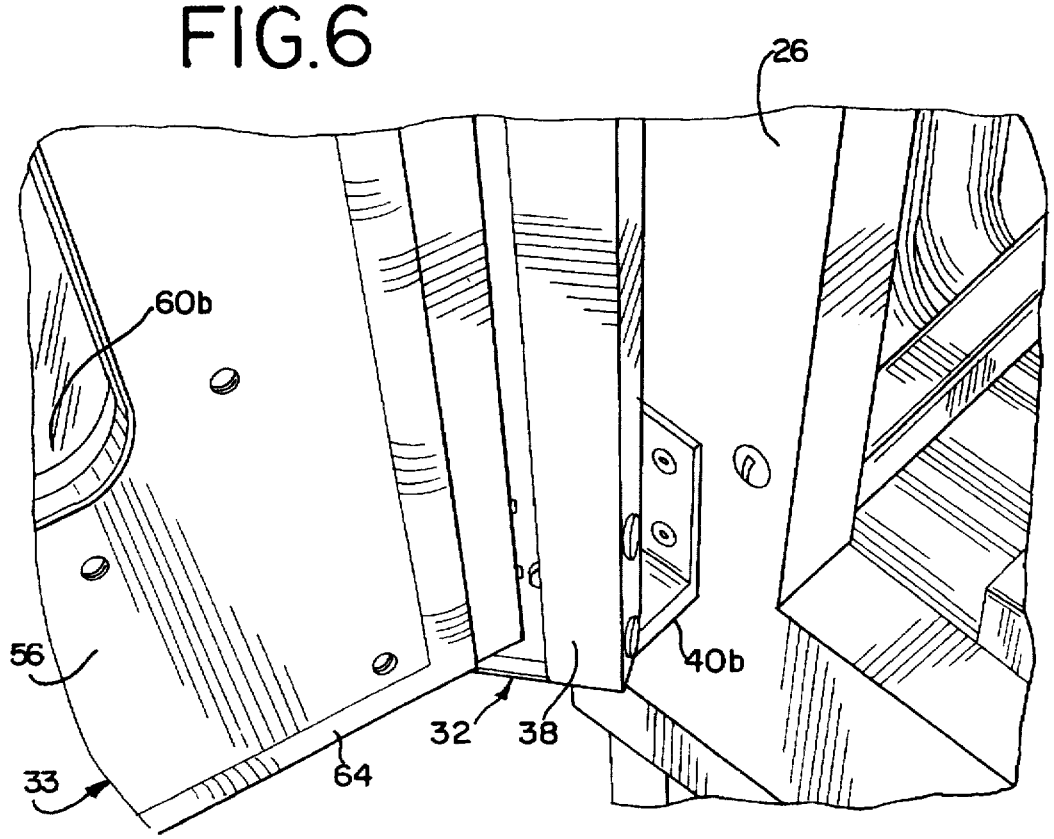

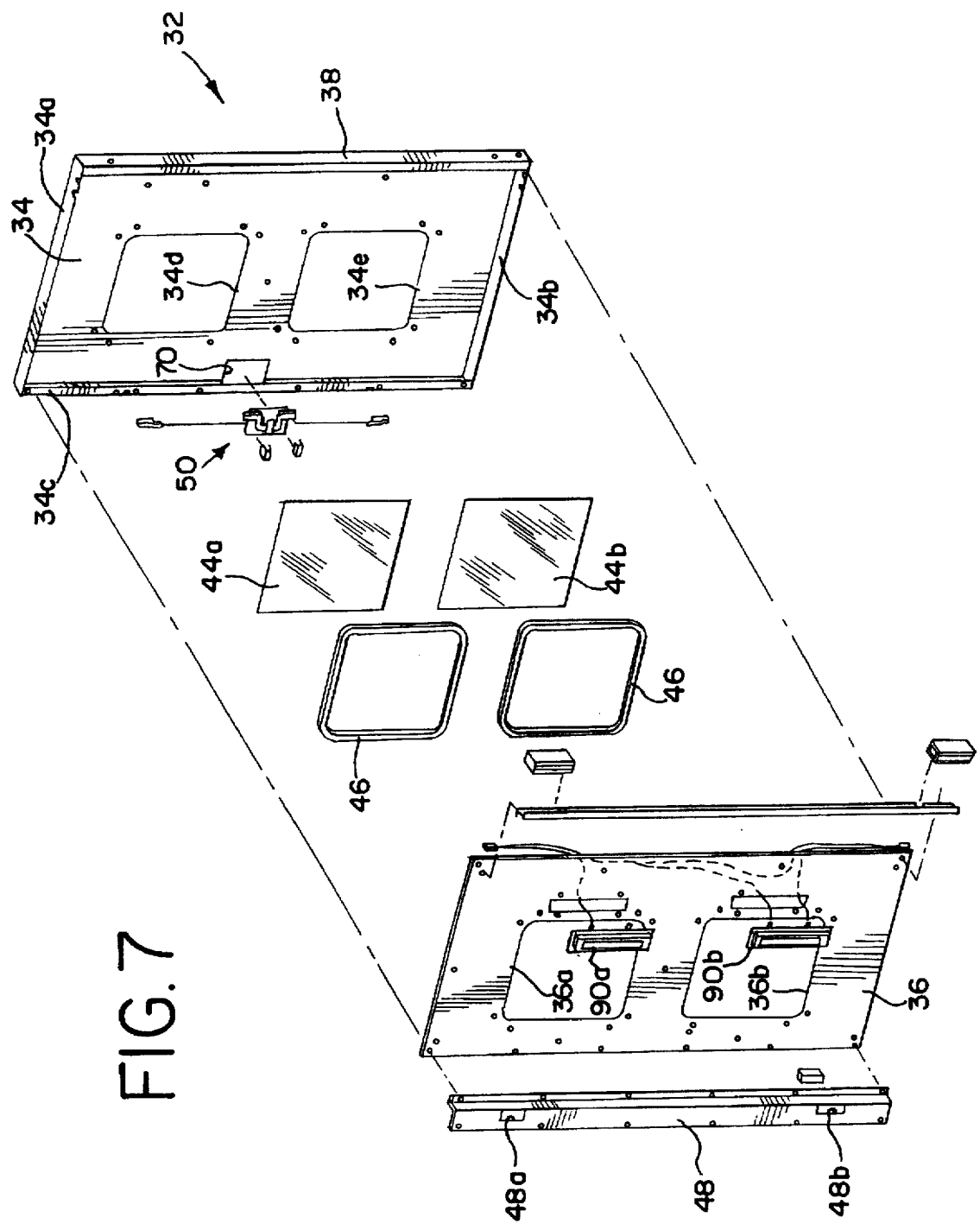

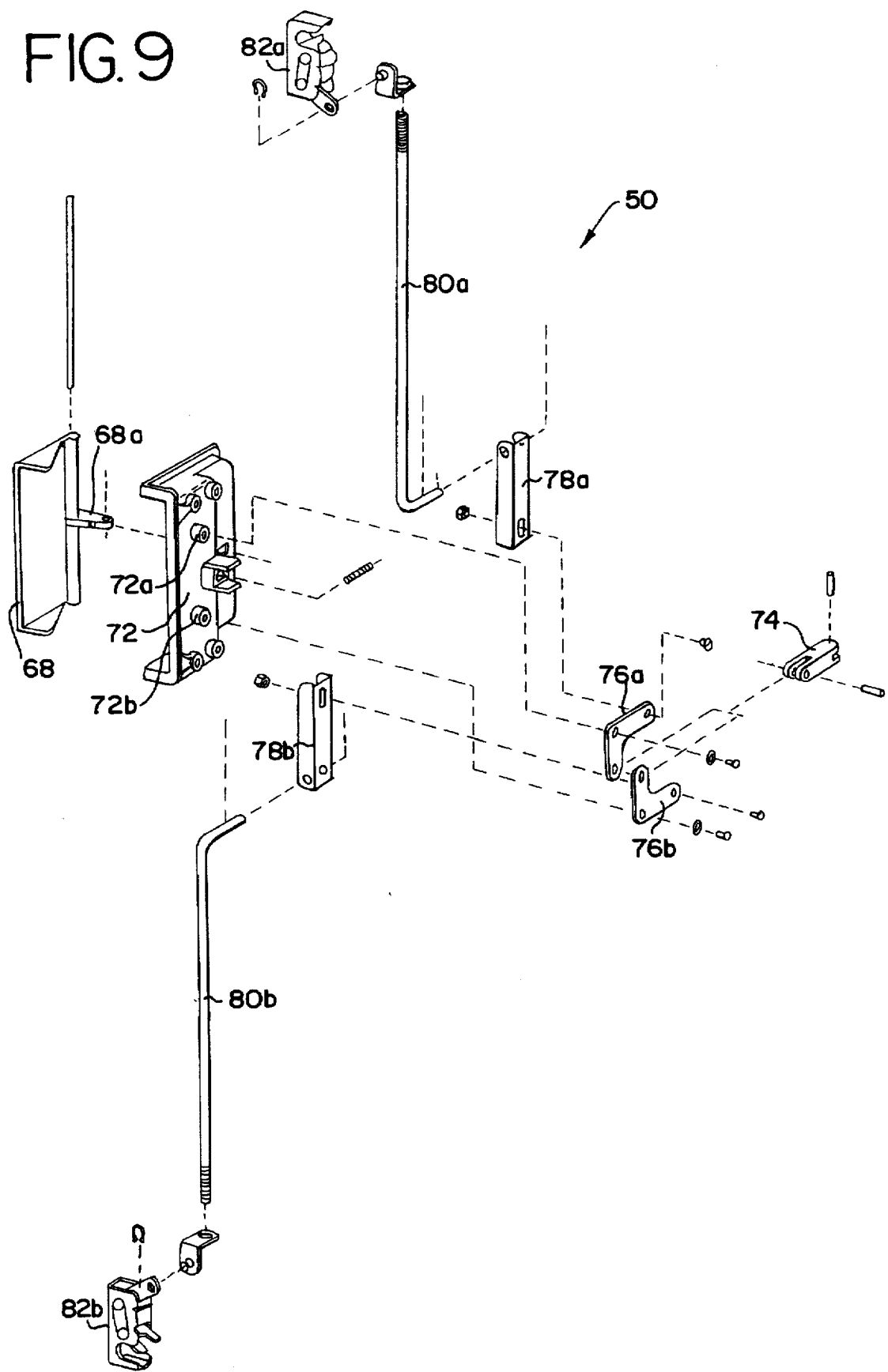

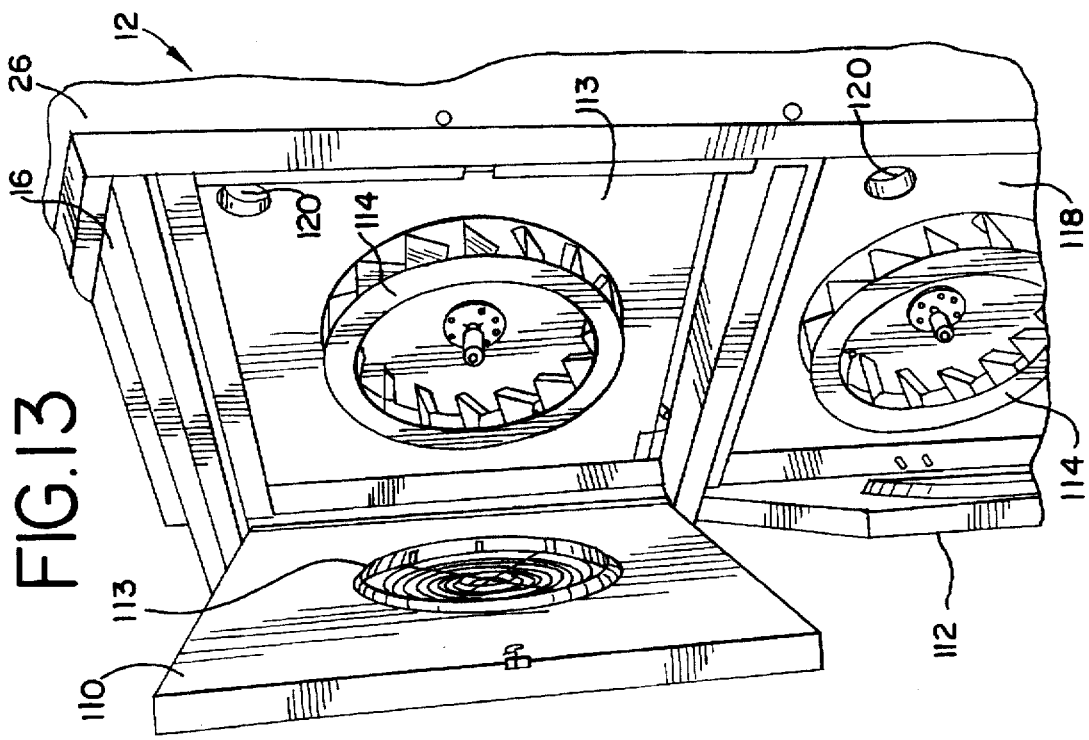
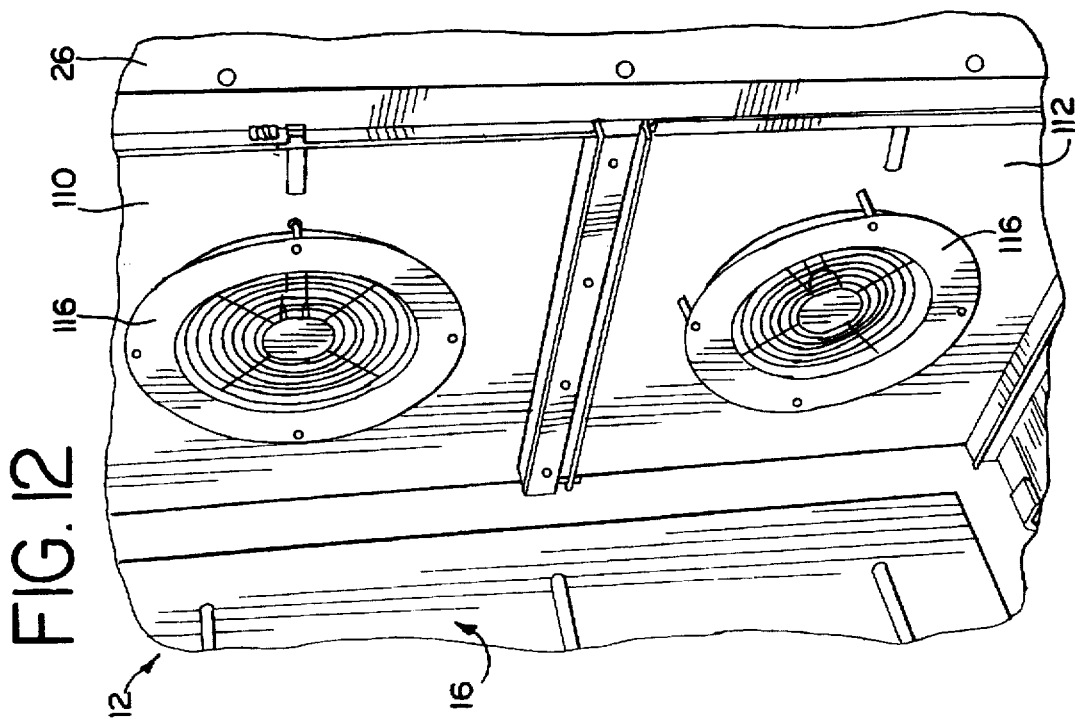

FOOD PROCESSING APPARATUS

This application is a Con. of Ser. No. 08/650,542, filed May 20, 1996, now abnd.

BACKGROUND OF THE INVENTION

The present invention relates generally to food processing apparatus, and more particularly to a combination steamer-oven having novel features that contribute to improved efficiency and operating characteristics of the apparatus.

It is a conventional practice in the preparation of food products, and particularly in the commercial preparation of food products, to utilize relatively large cooking apparatus which facilitate the preparation of relatively large quantities of food products within a single oven compartment or chamber within the apparatus. It is also known to provide both gas-fired and electric powered combination steam and dry ovens wherein an oven cavity may be operated as a forced-air convection oven, a forced-flow convection oven circulating superheated steam, or a steamer circulating saturated steam. See, for example, U.S. Pat. Nos., 4,817,582 and 4,851,644, both of which are assigned to the assignee of the present invention. An example of an atmospheric convection type steamer apparatus is disclosed in U.S. Pat. No. 5,368,008, also assigned to the assignee of the present invention. The combination steam and dry ovens illustrated in U.S. Pat. Nos. 4,817,582 and 4,851,644 are illustrative of ovens that may be mounted on countertops at a suitable operating height, while the steamer apparatus illustrated in U.S. Pat. No. 5,368,008 is illustrative of a free standing steamer apparatus having a pair of vertically adjacent food processing chambers or compartments each of which may have an individual control.

While the food processing apparatus illustrated in the aforementioned U.S. patents has proven highly successful in their operating characteristics and food preparation efficiency, more recent developments have introduced cooking apparatus having larger food processing chambers or compartments operative to receive relatively large racks of food laden trays or pans so that significantly higher quantities of food products are processed within a single oven or steamer chamber. This has led to the desirability of features which enhance the operating characteristics of these relatively large steamer-oven apparatus to both increase the food cooking efficiency and provide improved operator control and observation of the food products during cooking.

SUMMARY OF THE INVENTION

One of the primary of the objects of the present invention is to provide a food processing apparatus having novel features which enhance both cooking efficiency and operator control.

A more particular object of the present invention is to provide a steamer-oven apparatus for processing relatively large quantities of food products within a single compartment or chamber operative to receive a relatively large rack having food laden trays or pans thereon, the food processing apparatus including a novel door construction having hingedly connected inner and outer panels each of which has upper and lower windows configured to enhance operator visibility of the food products being processed and wherein the door assembly includes novel lighting allowing an operator to better observe the food products during cooking without glare to the operator.

Another object of the present invention is to provide a food processing apparatus for processing relatively large quantities of food products simultaneously within a single oven chamber or compartment defined in part by upper and lower internal side panels enabling selective circulation of heated cooking steam or dry air within the compartment to establish zoned heating.

Still another object of the present invention is to provide a food processing apparatus as described including a novel arrangement for circulating forced steam or air through the single relatively large volume cooking compartment so as to enhance zoned temperature control within the cooking compartment.

Still another object of the present invention is to provide a food processing apparatus as described which, in a gas-fired embodiment, includes a novel arrangement for introducing a deliming solution into the atmospheric steam generating system for deliming purposes.

Further objects, features and advantages of the present invention, together with the organization and manner of operation thereof, will become apparent from the following detailed description of the invention when taken in conjunction with the accompanying drawings.

BRIEF DESCRIPTION OF THE DRAWINGS

FIG. 3 is a fragmentary perspective view illustrating in greater detail the door of FIG. 2 in an open position relative to the food processing apparatus;

FIG. 4 is a perspective view showing the hingedly connected inner and outer panels of the door in open position relative to each other providing access between the door panels;

FIG. 5 is a fragmentary perspective view illustrating the hinged connection of the upper end of the door to the cabinet of the food processing apparatus adjacent the cooking chamber;

FIG. 6 is a fragmentary perspective view illustrating the hinge mounting of the lower end of the door to the cabinet adjacent the food processing chamber;

FIG. 7 is an exploded perspective view of the outer door panel;

FIG. 9 is an exploded perspective view of the handle and latch assembly utilized with the outer door panel to facilitate latched closing of the door relative to the food processing compartment access opening;

FIG. 12 is a fragmentary perspective view taken internally of the food processing chamber and showing the wall of the cooking chamber opposite the air plenum panels illustrated in FIGS. 10 and 11;

FIG. 13 is a fragmentary perspective view similar to FIG. 12 but showing the upper and lower hinged wall panels spaced inwardly from corresponding fan impellers that effect air or steam circulation during convection cooking.

DETAILED DESCRIPTION

Figure 1:
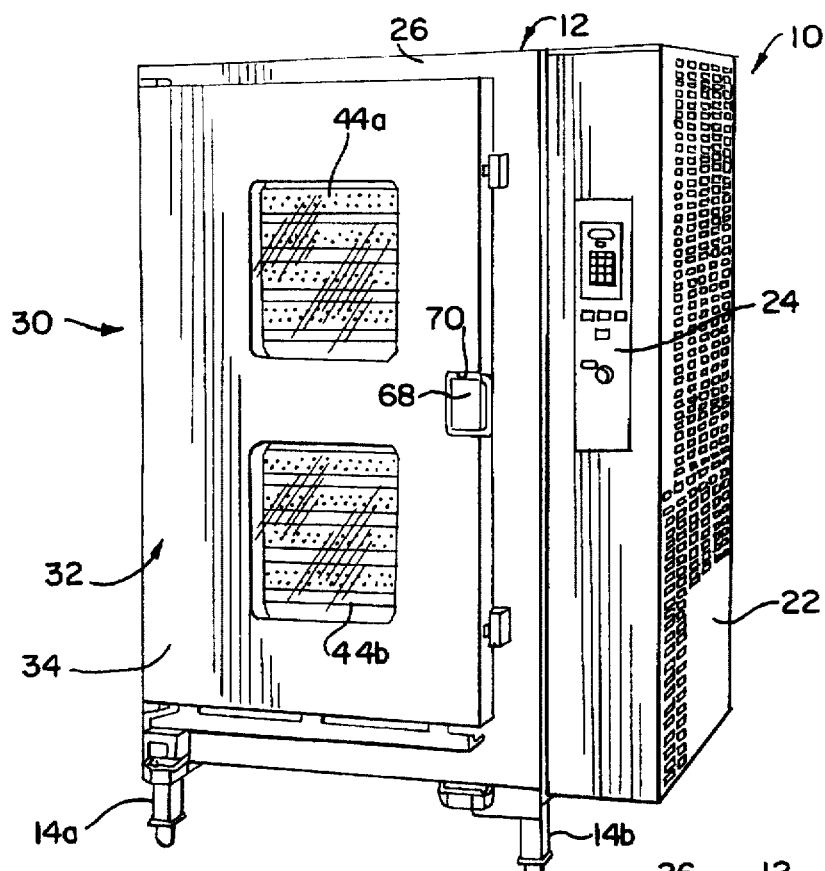
FIG. 1 is a perspective view of a food processing apparatus in the form of a steamer-oven that includes various features of the present invention.
Figure 2:
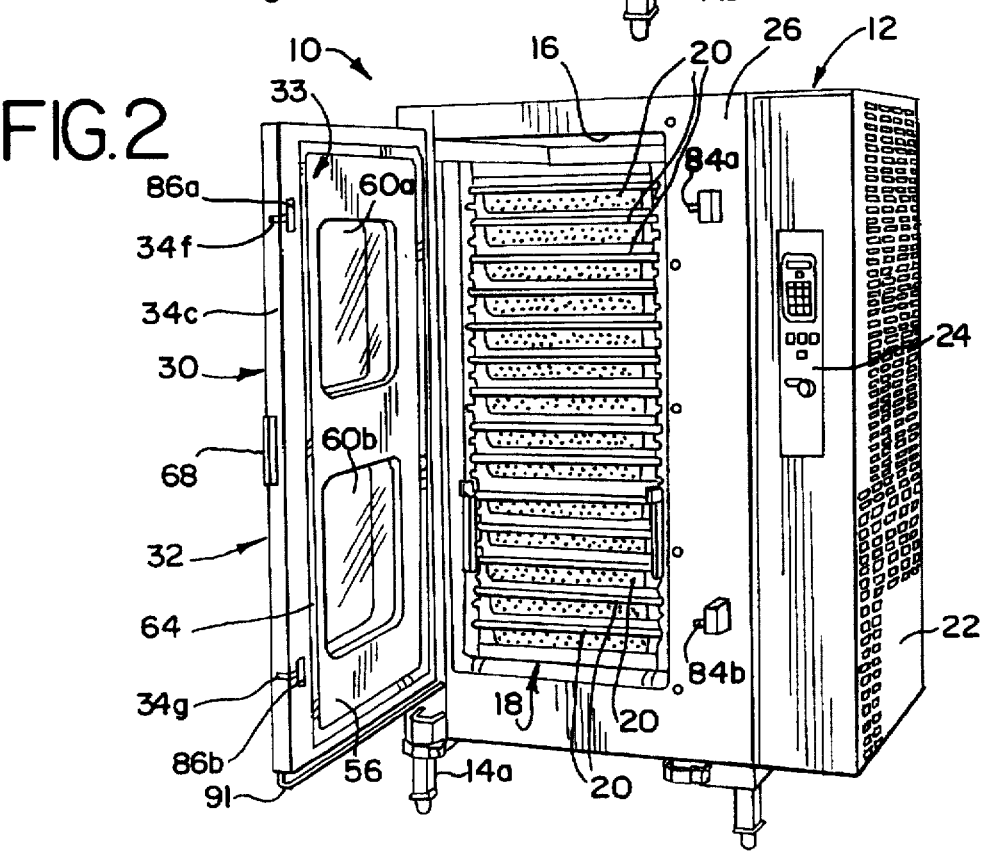
FIG. 2 is a perspective view of the food processing apparatus of FIG. 1 but with the access door to the food cooking chamber or compartment shown in an open position.

Referring now to the drawings, and in particular to FIGS. 1 and 2, a food processing apparatus in the form of a steamer-oven that enables cooking of food products either through convection steam or forced-air convection is indicated generally at 10. The food processing apparatus includes a free standing cabinet, indicated generally at 12, of generally rectangular configuration and having downwardly extending legs, two of which are shown at 14a and 14b, so as to space the bottom of the cabinet above a floor or other support surface. A food processing compartment or chamber 16 is formed within the cabinet 12 to receive a relatively large rack, indicated generally at 18, operative to support a plurality of vertically spaced generally horizontally oriented food support trays or pans 20 so that food disposed within the food pans or trays may be processed as by cooking. The cabinet 12 and the various internal components to be described are preferably made of a suitable corrosion resistant material, such as stainless steel. The cabinet 12 may house different means to heat the processing chamber or compartment 16 depending on whether it is desired to cook the food products by convection steam, as by a gas-fired steam generator, or to cook by an electrically heated forced hot air convection means supported within a compartment 22 forming part of the cabinet. A suitable solid state control 24 is provided on a forward surface 26 of the cabinet and includes a digital timer with LED readout, a power on/off and mode selection touch pad switch control, and various knob set temperature controls and continuous LED temperature displays.

A door 30 is hinged to the cabinet forward surface 26 adjacent the chamber or compartment 16 and is operable between an open position providing access to the chamber 16, as illustrated in FIG. 2, and a closed position, as illustrated in FIG. 1, wherein the door seals about the full periphery of the access opening to the compartment or chamber 16 during food processing. Referring to FIGS. 3-8, the door 30 includes an outer panel 32 and an inner panel 33 that are hingedly connected to enable close nesting relation as in FIG. 3, or enable relative separation to pivotally open or separated positions as in FIG. 4. The outer panel 32 is comprised of an outer panel portion 34 and an inner panel portion 36, as illustrated in FIG. 7, that are adapted to be assembled in sandwich fashion to form the outer door panel 32. The outer panel portion 34 has inwardly directed upper and lower flanges 34a and 34b which are integrally connected to a vertical flange 34c on the outer edge of the rectangular door panel portion 34. A hinge bar 38 is fixed to the right-hand or inner edge of the outer door panel 34 between the upper and lower flanges 34a and 34b. As illustrated in FIGS. 5 and 6, the upper and lower ends of the hinge bar 38 are pivotally connected to the forward surface 26 of the cabinet 12 through generally L-shaped hinge brackets shown at 40a and 40b, respectively, in FIGS. 5 and 6.

Both the inner panel portion 34 and outer panel portion 36 of the outer door panel 32 have equal size rectangular openings formed therethrough, as indicated at 34d and 34e in the outer panel portion 34 and at 36a and 36b in the inner panel portion 36. The inner panel portion 36 is fixed to the outer panel portion 34 within the flanges 34a,b and c and the hinge bar 38. A pair of rectangular glass panels or windows 44a and 44b are interposed between the inner and outer panel portions 34 and 36. Each of the glass windows 44a,b has a suitable gasket seal 46 around its perimeter to seal between the inner and outer panel portions when in assembled sandwich relation, the window panels 44 being slightly larger than the aligned openings 34d, 34e and 36a, 36b and being secured in fixed relation between the inner and outer panel portions. A latch cover plate 48 is secured to the inner surface of the inner panel 36 and extends the full height of the outer door 32 so as to form an internal channel to receive a handle and latch operating mechanism as indicated generally 50 in FIG. 7 and which will be described in greater detail below.

Figure 8:
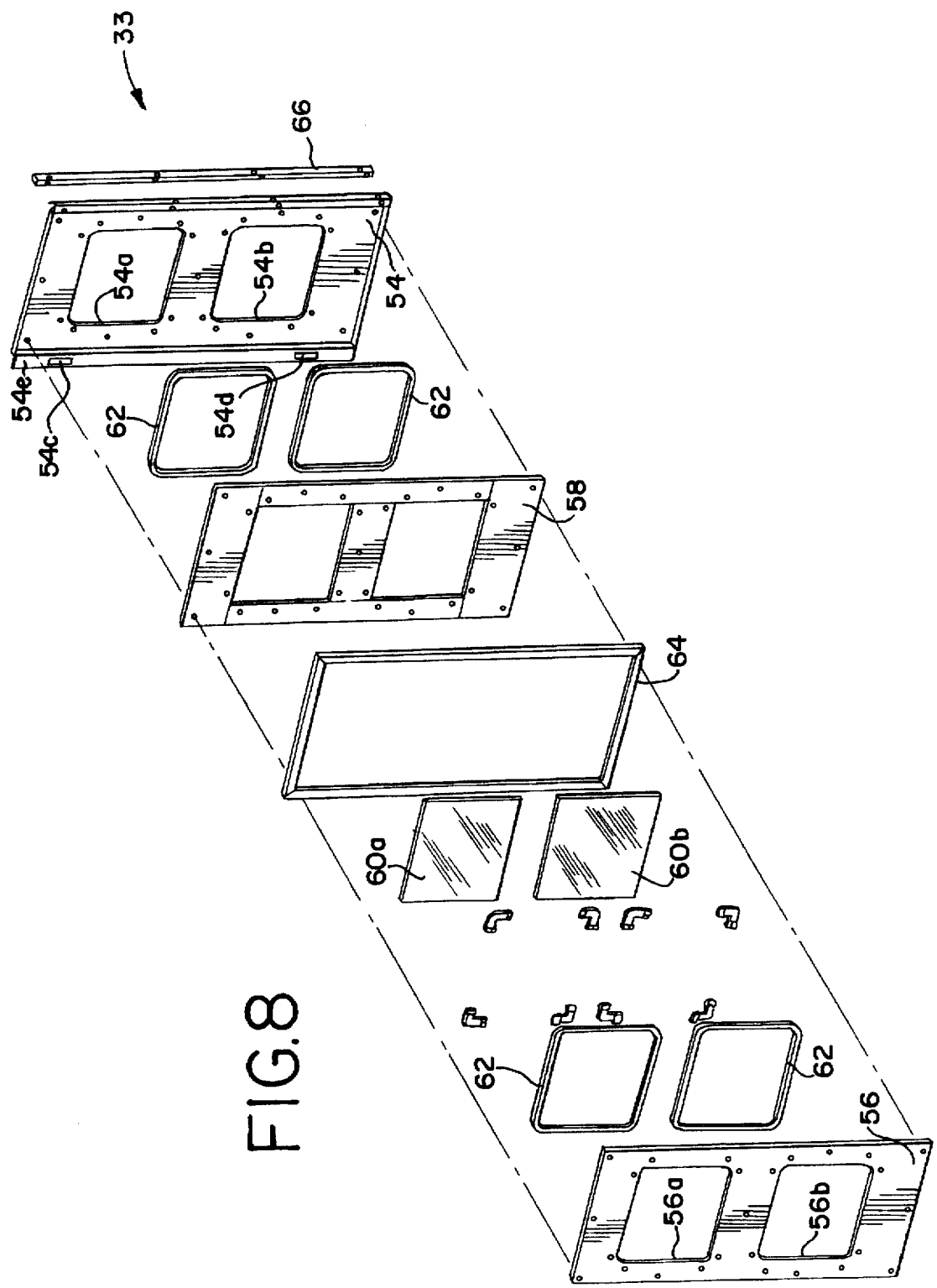
FIG. 8 is an exploded perspective view of the inner door panel.

Referring to FIG. 8, the inner door panel 33 includes an outer rectangular panel portion 54 and an inner panel portion 56 that are secured in sandwich fashion but between which is interposed an insulator board member 58. The outer and inner panel portions 54 and 56 have rectangular openings formed therein of a size greater than the size of the window openings 34d,e and 36a,b in the outer door panel 32, as indicated at 54a and 54b in the outer panel portion 54 and at 56a and 56b in the inner panel portion 56. A pair of rectangular glass panels or windows 60a and 60b of a size slightly greater than the respective openings 54a,b and 56a,b are supported on the insulator board member 58 adjacent rectangular openings in the insulator board by suitable brackets so that when the outer and inner panel portions 54 and 56 are secured in sandwich relation, the window panels 60a and 60b cover the respective openings 54a,b and 56a,b. Suitable rectangular gaskets 62 are interposed between the outer panel portion 54 and the insulator board member 58 peripherally of the window panels 60a and 60b and also between the inner panel portion 56 and the insulator board member to seal the window panels within the inner door panel 33. The inner panel portion 56 is slightly smaller in area than the outer panel portion 54 so as to create a channel peripherally of the inner panel portion 56 to receive a door gasket 64. The gasket 64 is sized so that when the inner and outer door panels 32 and 33 are in assembled relation and the door 30 is closed, the seal 64 seals against the outer surface 26 of the cabinet 12 peripherally of the access opening to the food processing compartment 16. The outer panel portion 54 of door panel 33 has a hinge bar 66 fixed to its right-hand edge, as viewed in FIG. 8. The hinge bar 66 extends between the upper and lower flanges 34a and 34b and is pivotally connected to these flanges to form a hinge connection between the outer and inner panels 32 and 33.

Referring to FIG. 9, the handle and latch mechanism 50 is illustrated in exploded perspective view and includes an operating handle 68 which is pivotally mounted to the inner surface of the outer panel portion 34 of the outer door panel 32 within a rectangular opening 70 (FIG. 7). The operating handle 68 has an operating arm 68a that extends through a handle housing 72 mounted to the inner surface of the outer panel portion 34 behind the opening 70. A connecting link 74 is pivotally connected to the inner end of the actuating arm 68a and has its opposite end pivotally connected to a pair of generally L-shaped pivot arms 76a and 76b that in turn are pivotally mounted on suitable bosses 72a and 72b, respectively, formed on the handle housing 72. The ends of the L-shaped pivot arms 76a,b opposite their pivotal connection to the pivot link 74 are connected through link brackets 78a and 78b, respectively, to latch rods 80a and 80b so that outward pivotal movement of the operating handle 68 from a position generally planar with the outer surface of the outer panel portion 34 of the outer door panel 32 causes the latch rods 80a and 80b to extend upwardly and downwardly, respectively. The upper end of the latch rod 80a is pivotally connected to a door latch 82a which, in turn, is mounted on the outer panel portion 34 of the outer door panel 32 adjacent an open-ended slot 34f in the outer edge flange 34c, as shown in FIGS. 3 and 4. Similarly, the lower end of the latch rod 80b is pivotally connected to a similar but inverted door latch 82b which in turn is mounted on the outer door panel portion 34 adjacent an open-ended slot 34g in the edge flange 34c. The door latches 82a and 82b are operative to releasably latch with horizontal latch pins 84a and 84b, respectively, mounted on the forward surface 26 of cabinet 12 (FIG. 2) when the door 30 is in its closed position relative to the cabinet. Outward actuation of the operating handle 68 releases the latches 82a,b from the latch pins 84a,b.

Referring again to FIG. 8, the outer panel portion 54 of the inner door panel 33 has a pair of vertically spaced rectangular openings 54c and 54d formed in a flange edge portion 54e. As illustrated in FIG. 4, a pair of latches 86a and 86b are mounted on the vertical side of flange 54e facing the outer door panel 32 adjacent the openings 54c and 54d. The latches 86a and 86b are adapted to extend into rectangular openings 48a and 48b, respectively, formed in the flange 48 of the outer door panel 36 when the inner door panel 33 is closed against the outer door panel 32 so that flange portion 54e of the inner door panel overlies and engages the outer surface of the latch cover 48 on the outer door panel 32. The latches 86a and 86b include latching members 88a and 88b, respectively, (FIG. 4) that are manually operable from externally of the inner door panel 33 to extend into the openings 48a and 48b and latch the inner door panel to the outer door panel 32 when the inner and outer door panels are in closed or nested relation to each other. In this manner, with the inner door panel 33 nested within the outer door panel 32, the combined inner and outer door panels may be pivotally moved about the hinge axis defined by the hinge bar 38 to a closed position against the forward surface 26 of the cabinet 12 at which time the upper and lower door latches 82a and 82b latch in releasable locking engagement with latch pins 84a and 86a on the forward surface 26 of the cabinet 12. Thereafter, outward pivotal movement of the handle 68 releases the latches 82a,b to enable opening of door 30.

In accordance with one feature of the invention, a pair of elongated light box assemblies 90a and 90b are mounted on the inner surface of the inner panel 36 of the outer door panel 32 so that the light box assemblies are each adjacent one of the openings 36a and 36b in side relation therefrom, as illustrated in FIG. 7. The light box assemblies 90a and 90b each includes a plurality of light bulbs which are connected in a suitable electrical circuit enabling selective energizing of the light box assemblies through a suitable control switch on the control panel 24. The windows 60a and 60b on the inner door panel 36 are of larger size than the windows 44a and 44b in the outer door panel so that, when energized, light from the light box assemblies 90a and 90b projects through the windows in the inner door panel 36 and illuminates the processing chamber 16, and thereby the food products being processed therein, without interfering with the operator's vision. By providing the hingedly connected inner and outer door panels 32 and 33, the panels may be separated for easy cleaning of the inner opposing surfaces of the window panes or panels. By slightly spacing the outer and inner panels 32 and 33 when in nested relation to each other, the outer door panel 32 is maintained in a cooler state than would otherwise be the case during food processing with convection steam or forced hot air. A condensate tray 91 is mounted along the bottom edge of the outer door panel 32 and has a suitable drain opening therein to receive condensate and enable draining into a suitable container.

Figure 11:
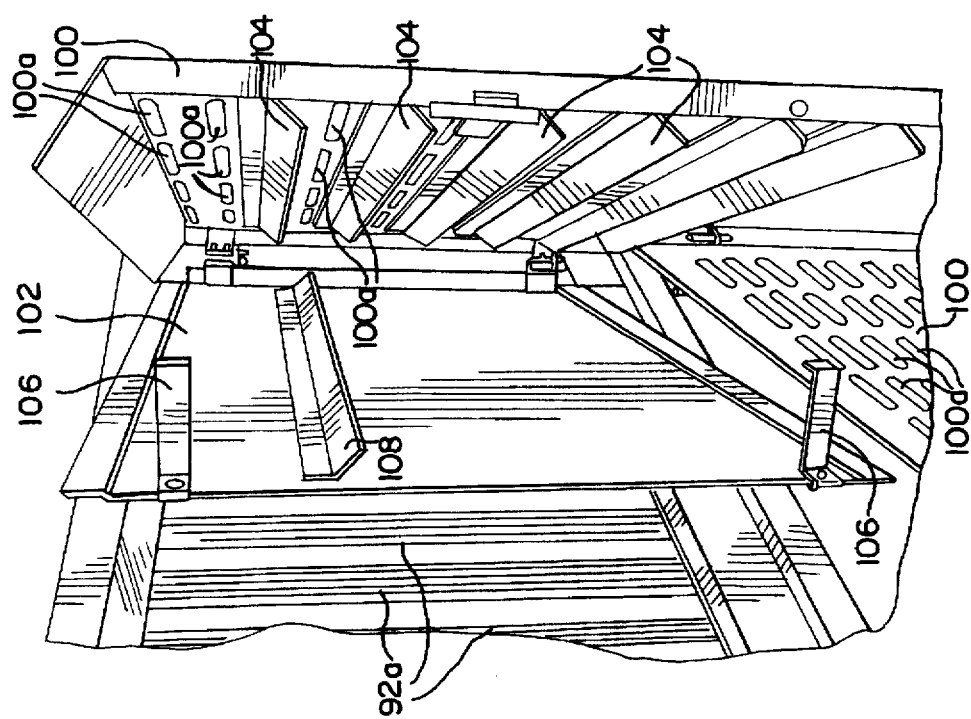
FIG. 11 is a fragmentary perspective view of the upper lift-out outer and inner plenum panels illustrated in FIG. 10 but shown in outwardly hinged open positions relative to vertically disposed heat exchange tubes which extend upwardly outside the left-hand side of the cooking chamber.
Figure 10:
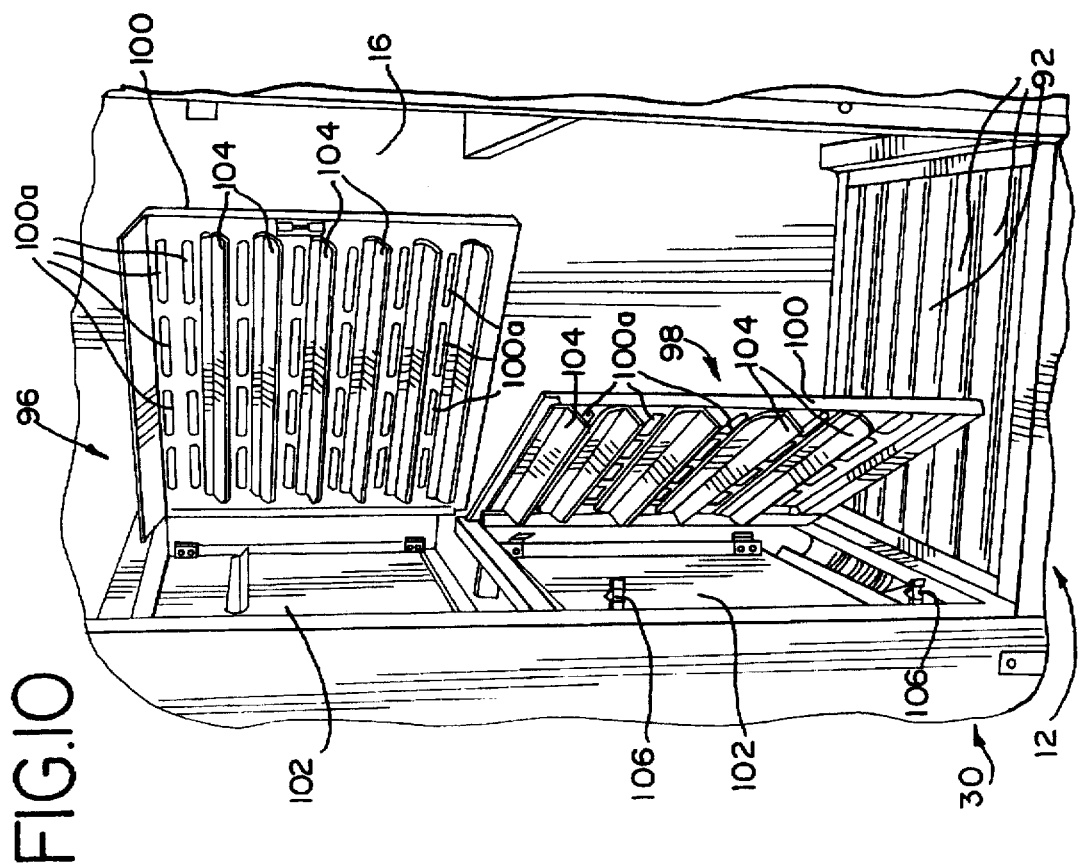
FIG. 10 is a fragmentary perspective view internally of the cooking chamber of the apparatus of FIG. 1 and illustrates upper and lower pairs of panels hinged internally of the cooking compartment to establish a air flow plenum for effecting heated air flow through the cooking chamber during use as a forced-air convection oven.

When utilizing a gas-fired burner to provide heat to the chamber 16, heated air is passed through heat exchange tubes that extend horizontally below the bottom of the compartment 16, vertically along the upper left-hand portion of the chamber, and generally horizontally across the top of the chamber, as illustrated in FIGS. 10 and 11. Such heat exchange pipes are illustrated at 92 in FIG. 10 as they pass horizontally below the chamber 16. The bottom surface plate of chamber 16 has been removed in FIG. 10 to expose the heat exchange tubes 92. The same heat exchange tubes extend vertically upwardly along the left-hand side of the food processing compartment 16 as illustrated at 92a in FIG. 11.

Referring to FIG. 10, upper and lower pairs of inner and outer panels, indicated generally 96 and 98, respectively, are releasably hingedly supported at their rearward vertical edges within the chamber 16 to enable lift out for cleaning. Each pair of upper and lower panels 96 and 98 includes substantially identical inner and outer panels, indicated at 100 and 102, respectively, with the inner panel 100 of each pair of inner panels having a plurality of horizontal rows of elongated air flow passages therein as indicated at 100a. As best seen in FIG. 11, the inner surface of each inner panel 100 has a plurality of downwardly angled louver plates 104 fixed thereon which serve to guide air flow through the air flow passages 100a.

The outer panel 102 of each pair of upper and lower side panels 96 and 98 comprises a generally planar stainless steel panel that may be positioned in relatively close proximity to the vertically extending heat exchange tubes 92a and does not have air flow passages therethrough. A spacer member 106 is fixed to the inner surface of each outer panel 102 to maintain the corresponding inner panel 100 in spaced relation from the outer panel and thereby establish an air plenum between the inner and outer panels 100 and 102 when in closed positions relative to each other. A suitable latch is provided on the inner panel 100 to facilitate releasable latching with the corresponding outer panel 102. Preferably at least one downwardly inclined horizontal air deflector 108 is fixed on the inner surface of at least the top outer panel 102, as shown in FIG. 11, to assist in guiding hot air passing downwardly through the corresponding air plenum into the food processing chamber 16 through the air passages 100a in the adjacent inner panel 100. During operation, hot air is caused to flow in a counterclockwise direction over the heat exchange tubes disposed above the heating chamber 16 and is mixed with hot air formed from air flowing over the lower horizontal heat exchange tubes so that hot air created by the upper and lower horizontal reaches of the heat exchange tubes, as well as the vertically extending portions of the heat exchange tubes, is caused to mix and enter the plenum chambers between the inner and outer panels 100 and 102 and pass into and through the food processing chamber through the elongated openings 100a in the inner panels 100. By controlling the size of the flow passages 100a, a desired rate of air flow may be obtained.

To facilitate better control of zoned heating within the relatively large food processing or cooking chamber 16, the food processing apparatus or steamer-oven 10 has a pair of air circulating impellers mounted to effect air flow into the upper and lower regions of the cooking chamber. Referring to FIGS. 12 and 13, the right-hand wall of the cooking chamber 16 opposite the upper and lower plenum panels 100 is defined by a pair of generally planar upper and lower rectangular stainless steel panels 110 and 112 which are hinged at their rearward vertical edges to the back wall of the cooking chamber 16. Each of the panels 110 and 112 has a circular opening 113 generally centrally therein behind which is mounted a rotatably driven fan impeller such as illustrated at 114 in FIG. 13. The central opening 113 in each of the upper and lower panels 110 and 112 has a diameter generally equal to the outer diameter of the corresponding fan impeller. Referring to FIG. 12, a ring member 116 is mounted on the inner surface of each of the upper and lower panels 110 and 112 in generally coaxial relation with the rotational axis of the corresponding fan impeller 114. The ring members 116 have central circular openings of a diameter less than the diameter of the corresponding opening in the panel behind which is mounted the corresponding fan impeller. Each of the rings 116 has an outer diameter greater than the diameter of the central opening 113 in the corresponding panel 110 and 112 behind which the fan impeller is mounted. This causes heated air flow generated by the impellers 114 to flow generally axially through the central openings in the ring members 116 and also causes air to flow radially through a circumferential opening or space peripherally of the rings established between the rings and the corresponding panels 110 and 112.

Referring to FIG. 13, a stainless steel panel 118 is mounted within the cabinet 12 on the back side of each of the impellers 114 so as to form a plenum chamber between each of the panels 118 and the corresponding upper or lower panel 110 and 112. Each panel 118 has a steam discharge orifice extending therethrough such as indicated at 120 in FIG. 13, so that steam introduced into the corresponding plenum chamber established between the panels 118 and corresponding upper and lower panels 110 and 112 is forced into the food processing chamber 16.

Figure 14:
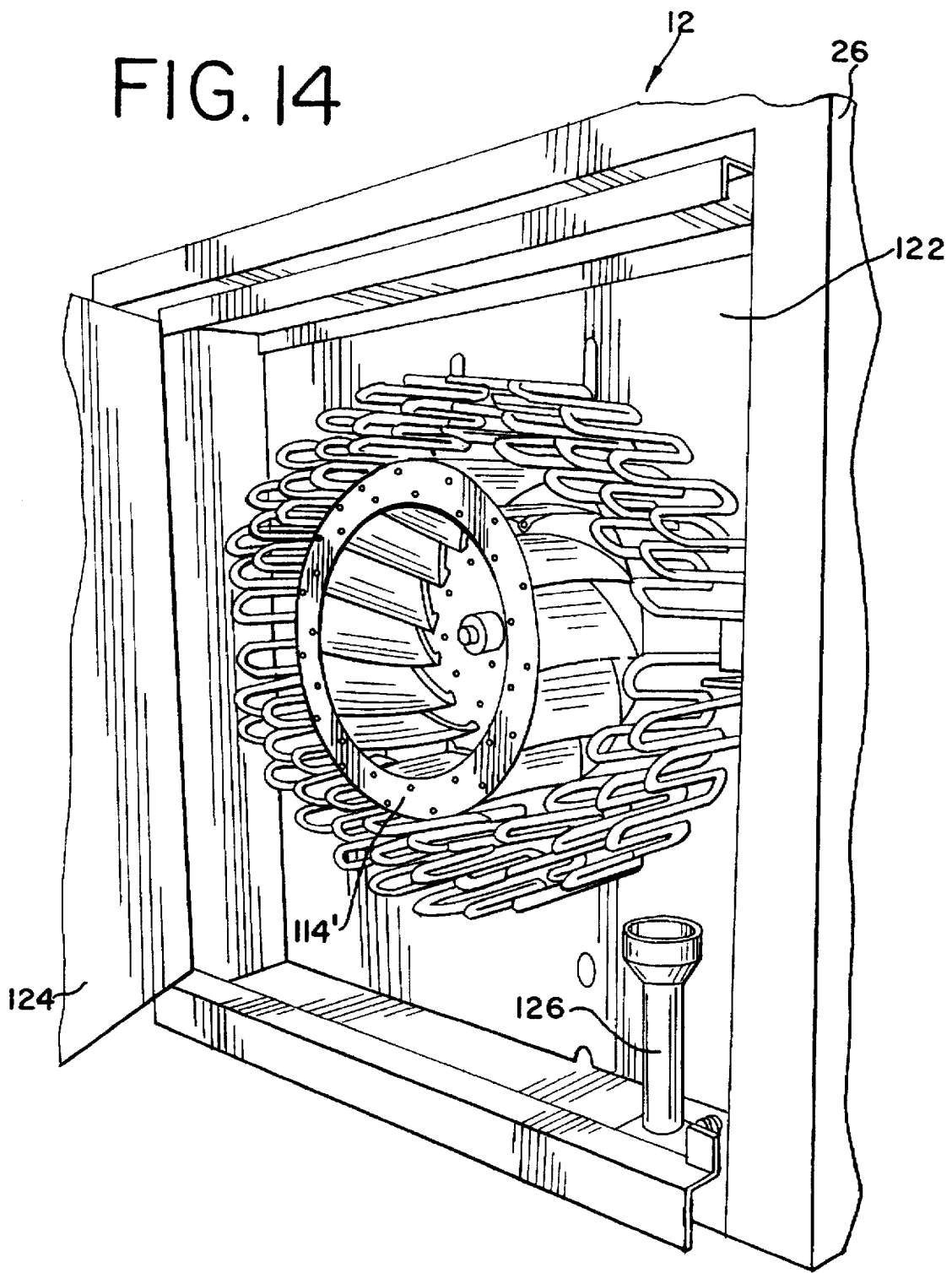
FIG. 14 is a fragmentary perspective view similar to FIG. 13 but illustrating an embodiment wherein heating elements are disposed about the fan impeller.

FIG. 14 illustrates an embodiment of the invention wherein an air fan impeller 114' is mounted inwardly of a vertically disposed plenum panel 122 that is generally similar to the plenum panel 118 illustrated in FIG. 13. A hinged inner panel 124 similar to the aforedescribed upper and lower panels 110 and 112 is hinged at its rearward vertical edge to establish a plenum chamber between the panels 124 and 122 about the impeller fan 114'. The inner panel 124 has a central opening and carries an air deflecting ring member 116 similar to the aforedescribed upper and lower panels 110 and 112. As illustrated in FIG. 14, the fan impeller 114' is surrounded by a plurality of electrical heating elements such that when electrically energized, air introduced into the plenum between the panels 122 and 124 is heated and forced into the food processing chamber 16 through an opening in the inner panel 124. In the embodiment illustrated in FIG. 14, a cleaning solution inlet tube is provided at 126 to facilitate the introduction of a cleaning or deliming solution to an associated steam generator.

While preferred embodiments and features of the invention have been illustrated and described, it will be understood that changes and modifications may be made therein without departing from the invention in its broader aspects. Various features of the invention are defined in the following claims.

What is claimed is:

1. In a food processing apparatus of the type including a cabinet defining an internal food processing compartment having a front access opening and sized to receive food products for processing, and a door hinged on the cabinet adjacent the access opening for movement about a first vertical hinge axis between an open position enabling access to the compartment and a closed position sealed about the periphery of the access opening; the improvement wherein said door comprises an inner panel and an outer panel pivotally interconnected to each other for movement relative to each other about a second vertical hinge axis parallel to said first hinge axis, said outer and inner panels being movable between positions wherein the outer and inner panels are in closely nested relation and positions wherein the outer and inner panels are in spaced apart relation enabling access between the outer and inner panels, said outer panel having a window enabling viewing through said outer panel, said inner panel having a window of larger size than the window in the outer panel and aligned with the window in the outer panel, and a light carried on the outer panel spaced from the corresponding window but positioned to project light through the window in the inner panel so as to illuminate the food processing compartment when the inner and outer panels are in relative closed relation to each other and the door is closed relative to the access opening.

2. Apparatus as defined in claim 1 wherein said outer and inner panels each have a pair of upper and lower windows, said windows in said inner panel being generally aligned with the windows in said outer panel and being of similar configuration but larger in area, and a pair of said lights carried on an inner surface of said outer panel each adjacent one of said windows in said outer panel so as not to be visible from externally of said outer panel when in nested relation with said inner panel, said windows in said inner panel enabling light to project into said compartment from said lights on said outer panel to illuminate said compartment.

3. Apparatus as defined in claim 1 wherein said outer panel is hinged to said cabinet for pivotal movement about said first hinge axis adjacent a vertical marginal edge of said outer panel, said inner panel having a vertical marginal edge hingedly connected to said outer panel to define said second hinge axis spaced from said first hinge axis.

4. Apparatus as defined in claim 1 wherein said inner panel carries a seal about its periphery operative to seal against the cabinet peripherally of said access opening when the door is in its closed position.

5. Apparatus as defined in claim 1 wherein said inner panel carries at least one latch operative to latch the inner and outer panels together when in said nested relation.

6. Apparatus as defined in claim 5 including at least one latch pin mounted on said cabinet adjacent said access opening, said outer door panel having a latch mechanism supported thereon operative to latch with said latch pin to releasably retain the door in its closed position relative to said access opening.

7. Apparatus as defined in claim 1 wherein said outer and inner panels define a spacing therebetween when in said nested relation so as to substantially reduce heat transfer from said inner panel to said outer panel.

8. Apparatus as defined in claim 1 wherein the door has a condensate tray mounted along a bottom edge of the outer door panel.

9. In a food processing apparatus of the type including a cabinet defining an internal food processing compartment having a front access opening and sized to receive food products for processing, and a door hinged on the cabinet adjacent the access opening for movement about a first vertical hinge axis between an open position enabling access to the compartment and a closed position closing the access opening; the improvement wherein said door comprises an inner panel and an outer panel pivotally interconnected to each other for movement relative to each other about a second vertical hinge axis parallel to said first hinge axis, said outer and inner panels being movable between positions wherein the outer and inner panels are in closely nested relation and positions wherein the outer and inner panels are in spaced apart relation enabling access between the outer and inner panels, said outer panel having a window enabling viewing through said outer panel, and said inner panel having a window aligned with the window in the outer panel to enable viewing of the food processing compartment when the inner and outer panels are in relative closed relation to each other and the door is closed relative to the access opening.

10. Apparatus as defined in claim 9 wherein said inner door panel includes an outer panel portion and an inner panel portion secured together in sandwich fashion, and an insulator member interposed between said outer and inner panel portions.

11. Apparatus as defined in claim 9 including at least one latch pin support on the cabinet adjacent said access opening, a locking latch carried on said outer door panel for latching relation with said latch pin when said door is in said closed position, and an operating handle mounted on said outer door panel in operative association with said locking latch to enable release of said locking latch from said latch pin for opening said door from a closed position.

12. Apparatus as defined in claim 11 including a pair of said latch pins secured on said cabinet in vertically spaced relation, and a pair of said latches carried on said outer door panel for releasable latching relation with said latch pins when the door is in its closed position relative to the cabinet.

13. Apparatus as defined in claim 11 including at least one latch mounted on said inner door panel for cooperative latching relation with said outer door panel when said inner and outer door panels are in said closely nested relation, said latch being accessible from a side of said inner door panel facing opposite the outer door panel to enable manual release of said latch from said outer panel.

14. Apparatus as defined in claim 9 wherein said inner door panel is smaller in area than said outer door panel so as to define a channel peripherally of the inner door panel, and including a gasket carried in said channel and configured to seal against the cabinet peripherally of the access opening when the door is in a position closing the access opening.

15. A food processing apparatus comprising, in combination a cabinet defining an internal food processing compartment having a bottom wall, laterally spaced upstanding sidewalls, a top wall and a front access opening, a door hinged on the cabinet adjacent the access opening for movement between an open position enabling access to the compartment and a closed position sealed about the periphery of the access opening, and a plurality of heat exchange tubes extending generally horizontally below said bottom wall, upwardly adjacent one of said upstanding sidewalls and generally horizontally above the top wall of the compartment to enable passage of a heated medium through said tubes, said one of said upstanding sidewalls being defined by at least one pair of panels having an inner panel defining a lateral boundary of said compartment and having air flow passages therethrough, and an outer panel generally parallel to said inner panel and defining an air plenum therebetween adapted to receive air heated by said heat exchange tubes, said inner panel having guide means operative to direct heated air from said plenum through said air flow passages into said compartment.

16. A food processing apparatus as defined in claim 15 wherein said air flow passages in said inner panel are defined by a plurality of generally horizontal rows of elongated air flow passages.

17. A food processing apparatus as defined in claim 16 wherein said air guide means on said inner panel includes a plurality of inclined air deflectors adapted to guide air flow through said air flow passages from air passed through said plenum.

18. Apparatus as defined in claim 15 including upper and lower pairs of said inner and outer panels defining separate air plenums therebetween operative to receive air heated by said heat exchange tubes.

19. Apparatus as defined in claim 15 including at least one air circulating impeller operatively associated with said compartment for effecting air flow into said compartment.

20. Apparatus as defined in claim 19 including a pair of air circulating impellers operatively associated with said compartment at a side boundary thereof opposite said pairs of inner and outer panels, said air circulating impellers being operative to effect air flow into upper and lower regions of said compartment.

21. Apparatus as defined in claim 19 wherein a boundary of said compartment opposite said upstanding sidewall defined by said pairs of inner and outer panels is defined by at least one sidewall panel having an opening therein through which air from said impeller can pass into said compartment.

22. Apparatus as defined in claim 21 wherein said opening in said sidewall panel is circular and coaxial with a rotational axis of said impeller, and including a ring member disposed in coaxial relation with said circular opening and said impeller, said ring member having a central circular opening of a diameter less than the diameter of the circular opening in the panel and having an outer diameter greater than the diameter of said circular opening in the panel so as to cause air from the impeller to flow generally axially through the central opening in the ring member and generally radially through a circumferential opening defined peripherally of the ring member between the ring member and the corresponding sidewall panel.

23. Apparatus as defined in claim 20 including means defining an air plenum chamber adjacent each of said air circulating impellers so that steam introduced into said plenum chamber is forced into the food processing compartment by said fan impeller.

* * * * *